(12) United States Patent
Talbot

(10) Patent No.: US 8,245,489 B2
(45) Date of Patent: Aug. 21, 2012

(54) COMBINE HEADER WITH GAUGE WHEELS TO CONTROL CUT HEIGHT

(75) Inventor: Francois R. Talbot, Winnipeg (CA)

(73) Assignee: MacDon Industries Ltd, Winnipeg, MB (CA)

(*) Notice: Subject to any disclaimer, the term of this patent is extended or adjusted under 35 U.S.C. 154(b) by 0 days.

(21) Appl. No.: 12/437,795

(22) Filed: May 8, 2009

(65) Prior Publication Data
US 2010/0281837 A1  Nov. 11, 2010

(51) Int. Cl.
*A01D 41/14* (2006.01)
(52) U.S. Cl. ........... 56/10.2 E; 56/15.8; 56/17.2; 56/208
(58) Field of Classification Search ................. 56/10.2 E, 56/15.8, 17.2, 15.7, 208–217
See application file for complete search history.

(56) References Cited

U.S. PATENT DOCUMENTS

| | | | |
|---|---|---|---|
| 5,157,905 A * | 10/1992 | Talbot et al. .................... | 56/15.9 |
| 6,758,029 B2 * | 7/2004 | Beaujot ....................... | 56/10.2 E |
| 6,789,379 B2 * | 9/2004 | Heidjann et al. ........... | 56/10.2 E |
| 7,249,448 B2 * | 7/2007 | Murphy et al. ................ | 56/15.8 |
| 7,401,455 B1 * | 7/2008 | Cleodolphi ................ | 56/10.2 E |
| 7,540,130 B2 * | 6/2009 | Coers et al. ................. | 56/10.2 E |
| 7,661,251 B1 * | 2/2010 | Sloan et al. ................. | 56/10.2 E |

* cited by examiner

*Primary Examiner* — Alicia Torres
(74) *Attorney, Agent, or Firm* — Adrian D. Battison; Ade & Company Inc.

(57) ABSTRACT

A header assembly for a combine harvester includes a header carried by an adapter on the feeder house of the combine and on a pair of gauge wheels which can be adjusted from inside the cab to change a height of the cutter bar from the ground. This is used in combination with an Automatic Header Height Control so that the main suspension is adjusted to carry approximately 90% of the header weight, the header is dropped on the ground until the gauge wheels contact the ground, and causes the header to "float" with respect to the main carrier frame and the AHHC is set so that the combine feeder house stops lowering when a pre-set amount of header to adapter separation (float) is achieved with the AHHC operating to maintain this set amount by controlling the height of the feeder house.

12 Claims, 3 Drawing Sheets

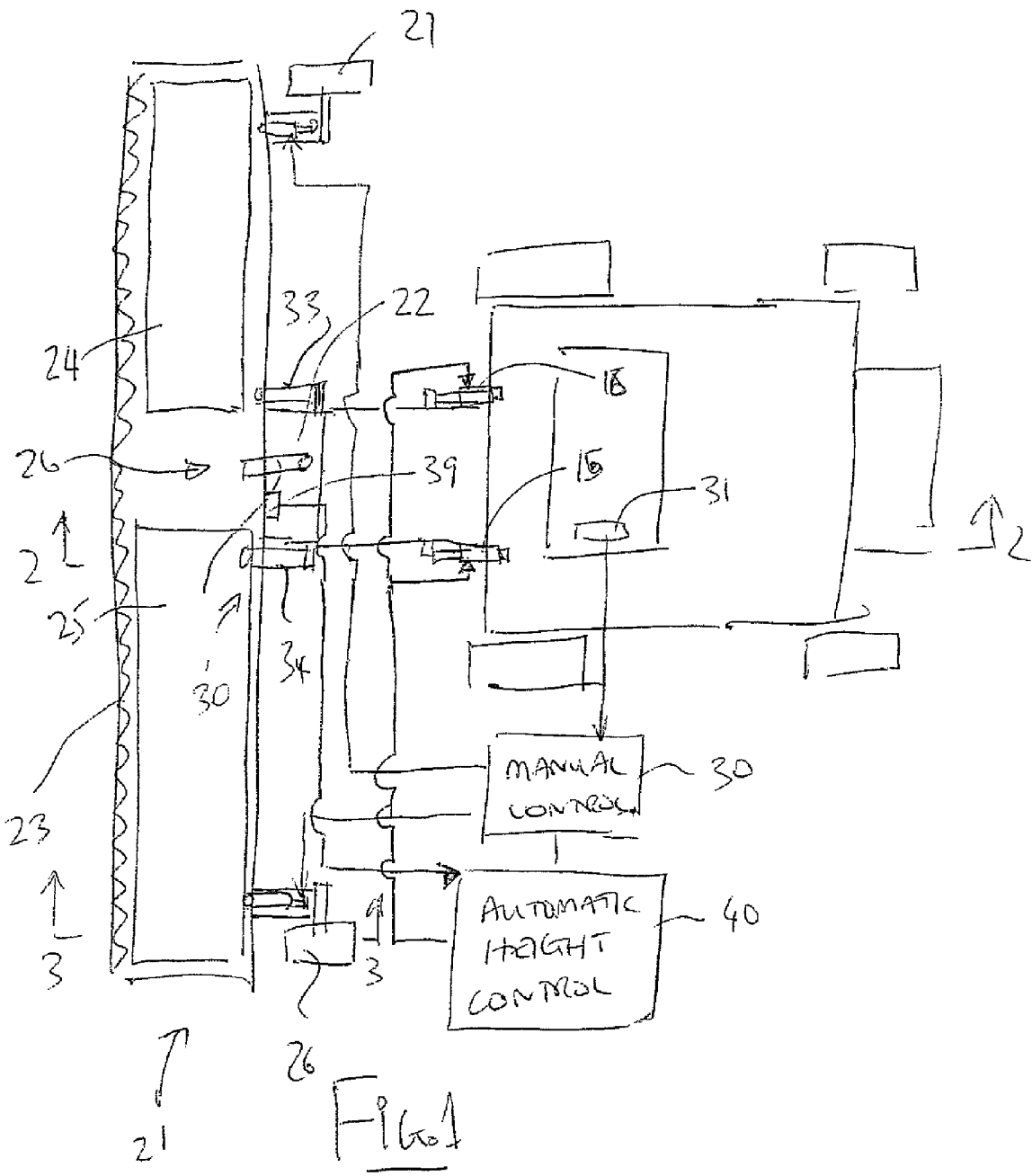

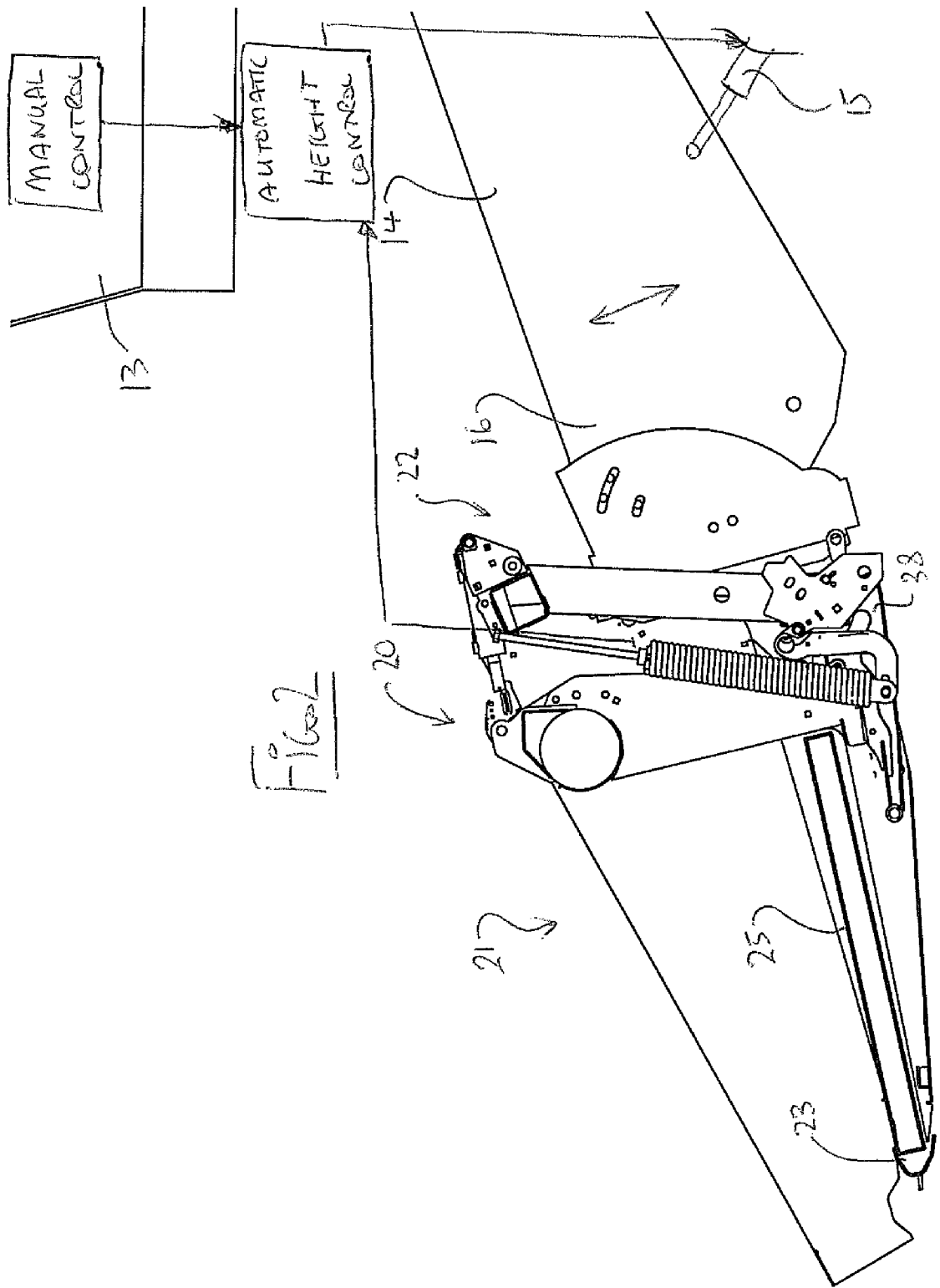

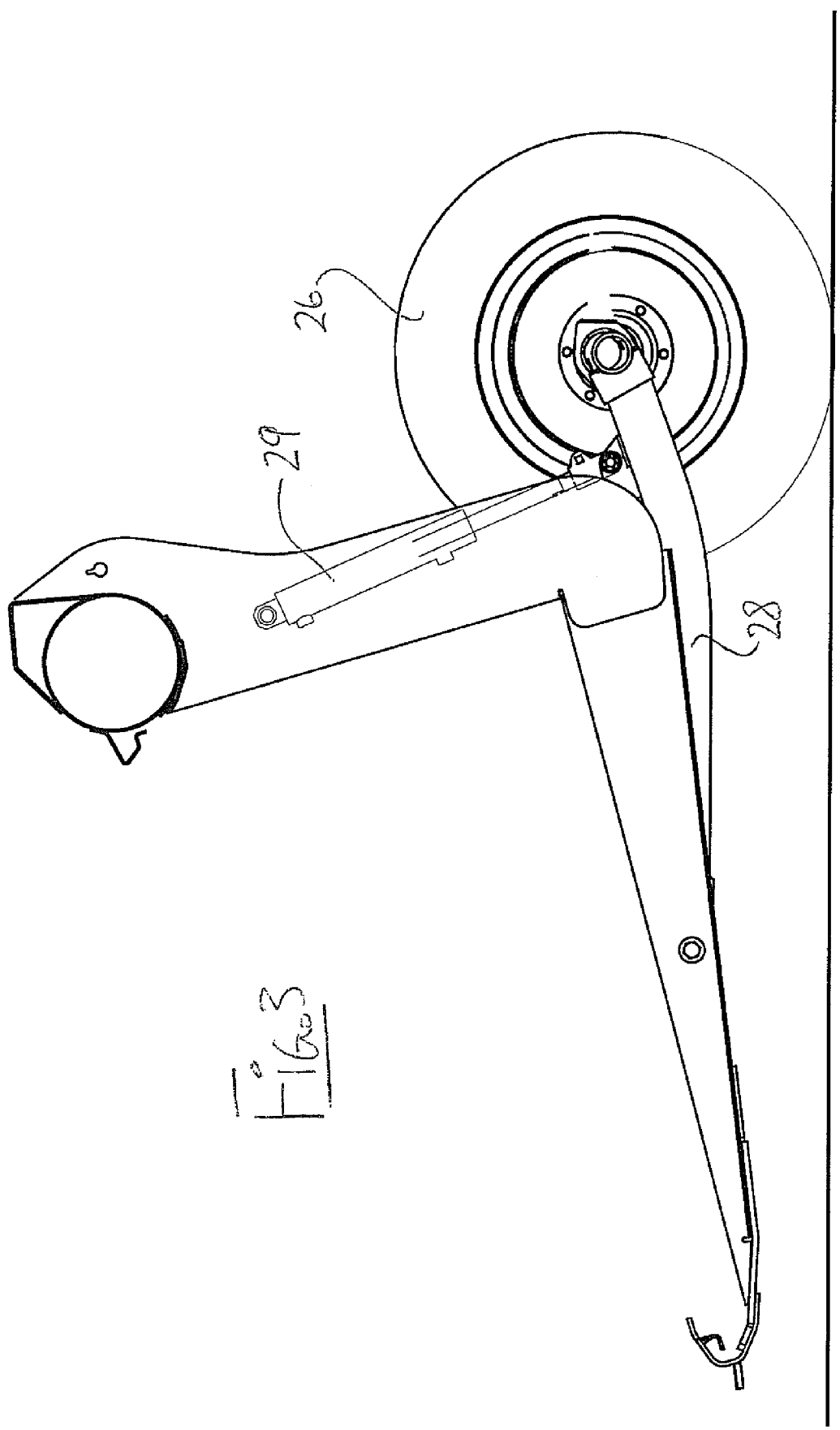

COMBINE HEADER WITH GAUGE WHEELS TO CONTROL CUT HEIGHT

This invention relates to a header for a combine harvester where the header includes ground engaging gauge wheels to provide stability to the header when cutting off the ground.

BACKGROUND OF THE INVENTION

Typically headers for combine harvesters are mounted on the feeder house of the combine with the mounting arrangement providing a floating action of the header relative to the feeder house so that the cutter bar can rest on the ground and float over the ground in a cutting action.

In some cases an automatic header height control system is provided with header to feeder house position indicators which allow the header to automatically adjust flotation to ground conditions, eliminating the need for the operator to make constant adjustments.

In some cases however it is desirable to provide a cutting action at a position where the cutter bar is at a raised height so that no stability is provided by engagement with the ground. In this arrangement, the header is typically provided with ground engaging gauge wheels at or adjacent respective ends of the header to gauge a required height from the ground.

This is normally done with gauge wheels that carry part of the weight of the header, with the rest carried by the main suspension, with springs on the gauge wheels in order to absorb the high shock loads when hitting a bumps and in order to provide some adjustment of cutter bar height while maintaining wheel engagement with the ground.

One of the issues with this system is to provide sufficient stability of the header when cutting at the raised height and while traveling at higher cutting speeds.

Some of the different ways to do this and their problems include:

Gauge wheel with a soft spring, however this does not provide enough header stability;

Gauge wheel with a stiff spring, this provides more stability but the stiff spring action can "throw" the header up to an unacceptable degree;

Gauge wheel with a stiff spring as above but combined with a shock absorber, this is better than the spring alone as above, but there remain issues with stability;

Gauge wheel mounted solid on the header, this does not allow changing the height of the cutter bad while maintaining ground contact with the gauge wheel s and causes huge shock loads;

Ground sensors in place of the gauge wheels to provide direct control signals to the suspension system, but this system does not react quickly enough to provide the required control and stability. Also, with ground sensors the header has to be positioned on a bottom stop when cutting off the ground so that the header is effectively fixed relative to the combine. As a result, when the combine goes over bumps the oscillation of the combine causes the header to move up and down, causing an irregular cut.

SUMMARY OF THE INVENTION

It is one object of the invention to provide a header for a combine harvester where the header includes ground engaging gauge wheels to provide stability to the header when cutting off the ground.

According to one aspect of the invention there is provided a header assembly for attachment to a combine harvester comprising:

a header having a cutter bar for cutting standing crop and a crop transport device for transporting the standing crop inwardly from ends of the header to a collection location for feeding to the combine harvester;

an adapter for mounting the header on a feeder house of the combine;

the adapter being arranged such that the crop at the collection location is fed through the feeder house to the combine harvester the adapter being arranged such that the header is carried on the feeder house for movement of the header with the combine harvester over the field to be harvested;

at least two ground engaging gauge wheels on the header one on each side of the adapter;

each gauge wheel being mounted on the header for up and down adjustment movement of a position of the gauge wheel relative to the header to control the height of the cutter bar of the header from the ground;

an adjustable link operable by a control switch arranged to be located in a cab of the combine harvester to adjust the position of the gauge wheel relative to the header to a required position so as to adjust a height of cut of the cutter bar;

wherein the gauge wheels are mounted on the header such that, when adjusted to the required position, the gauge wheels are fixed relative to the header substantially without any suspension floating movement relative thereto;

a suspension system for carrying the header on the adapter;

the suspension system being arranged such that a major part of the weight of the header is carried on the feeder house and a smaller part is carried on the gauge wheels;

a bottom stop arranged to limit downward movement of the header relative to the adapter;

a float sensor for sensing a float distance of the header relative to the bottom stop and for generating a signal indicative thereof;

an automatic header height control system arranged to raise and lower the feeder house in response to the signal from the float sensor so as to attempt to maintain the float distance at a required set value.

It is important that the adjustable links move in synchronism and this can be achieved using a master and slave cylinder.

The suspension system is generally arranged such that upward movement of the feeder house acts to reduce the separation between the header and the adapter and downward movement of the feeder house acts to increase the separation between the header and the adapter.

Preferably the adjustable link is a hydraulic cylinder. However an electric actuator or other adjustable system operable from the cab could be used.

Preferably the suspension system is adjustable so as to set a required proportion of the weight of the header which is carried on the feeder house relative to a proportion of the weight of the header which is carried on the gauge wheels.

Preferably the suspension system is arranged such that the proportion of the weight which is carried on the feeder house is of the order of 90%.

Thus in the arrangement as described hereinafter, the gauge wheel which can be adjusted from inside the cab is used in combination with an Automatic Header Height Control so that:

a) The main suspension is adjusted to carry approximately 90% of the header weight b) The header is dropped on the ground until the gauge wheels contact the ground, and causes the header to "float" with respect to the main carrier frame;

c) The AHHC is set so that the combine feeder house stops lowering when a pre-set amount of header to adapter separation (float) is achieved.

This allows the header to move up and down smoothly to follow the ground contour.

To change the cutting height, the cylinders attached to the gauge wheels are operated. The AHHC then causes the main lift cylinders to react so that the pre-set float is maintained.

The arrangement described hereinafter may have one or more of the following advantages:

It follows ground contour without having to carry excessive weight with the gauge wheel;

The cutting height is adjustable from the combine cab through the whole cutting range without changing the header angle;

With the AHHC, the weight carried by the gauge wheel is the same through the cutting range;

With separation between the header and the adapter, the movement of the combine from going over uneven terrain does not cause the header to move up and down, thus maintaining a more even cut height.

BRIEF DESCRIPTION OF THE DRAWINGS

One embodiment of the invention will now be described in conjunction with the accompanying drawings in which:

FIG. 1 is a schematic pan view of a combine harvester including a header assembly according to the present invention.

FIG. 2 is a schematic cross sectional view along the lines 3-3 of FIG. 1.

FIG. 3 is a schematic cross sectional view along the lines 2-2 of FIG. 1.

In the drawings like characters of reference indicate corresponding parts in the different figures.

DETAILED DESCRIPTION

A combine harvester is shown schematically at 10 and includes ground wheels 11, a main housing 12 containing the crop processing devices, a cab 13 for the operator and a feeder house 14 for receiving the crop material and feeding it into the housing for processing. The details of combine harvesters are well known to a person skilled in this art so that no detail is necessary for an understanding of this invention.

The feeder house is mounted on the housing in a manner which allows it to be raised and lowered to lift the header carried on the front of the combine. For example the feeder house includes cylinders 15 which raise and lower the front end 16 of the feeder house.

The present invention is particularly directed to the construction of the header assembly 20 for attachment to the feeder house of the combine harvester.

The whole header assembly 20 includes a header 21 and an adapter or connector 22 which connects the header to the feeder house so that the feeder house acts as a support assembly for the header. The adapter 22 is provided to control the feeding of material into the feeder house and to provide a lifting force to the header to carry it forwardly on the front of the feeder house.

The header is generally of a conventional construction well known to a person skilled in this art and the major components include a cutter bar 23 for cutting standing crop and a crop transport device defined by a pair of drapers 24 and 25 for transporting the standing crop inwardly from ends of the header to a collection location 26 for feeding to the combine harvester.

The header includes two ground engaging gauge wheels 27 and 27A on the header one on each side of the adapter 21. The number of wheels can be increased in some cases so that double wheels are used or wheels on an axle but in generally the wheels act so support the header on each side of the support from the adapter.

Each gauge wheel is mounted on the header for up and down adjustment movement of a position of the gauge wheel relative to the header to control the height of the cutter bar of the header from the ground. Thus in the example shown the wheel is mounted on a pivot arm 28 pivotally mounted on the header frame so that the arm projects rearwardly from the rear of the frame with the wheel at the rear end. The arm 28 is attached to the frame by an adjustable link which is typically a cylinder 29 operable by a control switch or manual control 30 including a manual switch 31 arranged to be located in the cab 13 of the combine harvester to adjust the position of the gauge wheel relative to the header to a required position so as to adjust the height of cut of the cutter bar from the ground.

The gauge wheels 27 and 27A are fixed to the cylinders which are fixed to the frame so that the wheels are mounted on the header such that, when adjusted to the required position, the gauge wheels are fixed relative to the header substantially without any suspension floating movement relative thereto. Thus there are no springs or suspension movements allowed and the wheel is rigid to the frame.

The connection between the adapter and the header includes a suspension system 30 with a center top link 32 and two side suspension arms 33 and 34 for carrying the header on the adapter. As is well known, the suspension arrangement allows side to side pivotal movement of the header relative to the adapter as well as vertical floating movement of the header, that is upwardly and downwardly. Thus the suspension arms 33 and 34 include springs 33A and 34A which have a spring force which can be adjusted to vary the lifting force applied to the header from the adapter.

Thus the suspension system is adjustable so as to set a required proportion of the weight of the header which is carried on the feeder house relative to a proportion of the weight of the header which is carried on the gauge wheels.

The springs of the suspension system are arranged such that a major part of the weight of the header is carried on the feeder house and a smaller part is carried on the gauge wheels and typically the proportion of the weight which is carried on the feeder house is of the order of 90%.

The suspension may be arranged such that upward movement of the feeder house acts to increase a lifting force to the header and downward movement of the feeder house acts to decrease the lifting force to the header and/or such that upward movement of the feeder house acts to reduce the separation between the header and the adapter and downward movement of the feeder house acts to increase the separation between the header and the adapter, although these may not occur depending on the mechanical arrangement or may not occur in all parts of the range of movement.

A bottom stop 38 is provided which is arranged to limit downward movement of the header relative to the adapter. A distance sensor 39 is provided for sensing a distance of a point on the header which moves with the header in suspension movement relative to the bottom stop 38, which is stationary relative to the harvesting machine. The distance sensor therefore generates a signal indicative of the sensed changes in said distance.

An automatic header height control system 40 is provided which is arranged to raise and lower the feeder house in response to the signal from the sensor 39 so as to attempt to maintain the sensed distance at a required set value. The set value is selected so that the header is free to float between the bottom stop and an upper limit of movement both upwardly and downwardly to an extent to accommodate changes in ground height. Thus the distance of the header from the ground is controlled by the gauge wheels and the weight of the header is primarily carried on the suspension of the feeder house. In the event that the set float distance from the bottom stop decreases because the header has moved downwardly relative to the feeder house, the lift cylinders 15 and 16 are operated by the automatic height control to lower the feeder house. In the event that the set float distance from the bottom stop increases because the header has moved upwardly relative to the feeder house, the lift cylinders 15 and 16 are operated by the automatic height control to raise the feeder house. The automatic header height control system is known to a person skilled in the art so that further details of the electronics necessary to effect the necessary controls is not required.

In operation, the header is dropped on the ground until the gauge wheels contact the ground, and causes the header to "float" with respect to the main carrier frame. The AHHC is set so that the combine feeder house stops lowering when the pre-set amount of header to adapter separation (float) is achieved. This allows the header to move up and down smoothly to follow the ground contour. To change the cutting height, the cylinders attached to the gauge wheels are operated. The AHHC then causes the main lift cylinders to react so that the pre-set float is maintained.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A header assembly for attachment to a combine harvester comprising:
a header having a cutter bar for cutting standing crop and a crop transport device for transporting the cut crop inwardly from ends of the header to a collection location for feeding to the combine harvester;
an adapter for mounting the header on a feeder house of the combine harvester;
the adapter being arranged such that the crop at the collection location is fed through the adapter to the feeder house so as to enter the combine harvester;
the adapter being arranged for connection to the feeder house such that the header is carried by the adapter so as to be supported by the feeder house for movement of the header with the combine harvester over the field to be harvested;
at least two ground engaging gauge wheels on the header, one on each side of the adapter;
each gauge wheel being mounted on the header for up and down adjustment movement of a position of said each gauge wheel relative to the header to control the height of the cutter bar of the header from the ground;
link operable by a control switch arranged to be located in a cab of the combine harvester to adjust the position of the gauge wheel relative to the header to a required position so as to adjust a height of cut of the cutter bar;
wherein the gauge wheels are mounted on the header such that, when adjusted to the required position, the gauge wheels are fixed relative to the header substantially without any floating movement relative thereto;
a suspension system for carrying the header on the adapter;
the suspension system including at least one first mechanical spring connected to a first side of the adapter and at least one second mechanical spring connected to a second side of the adapter which first and second springs flex independently to allow movement of the header at least upwardly and downwardly relative to the adapter;
wherein said at least one first and said at least one second springs are connected between the adapter and the header;
the suspension system being arranged such that a major part of the weight of the header is carried on the feeder house and a smaller part is carried on the gauge wheels;
a distance sensor for sensing changes in distance between a point on the header and a point on the adapter as the header moves upwardly and downwardly relative to the adapter and for generating an active distance signal proportional to the sensed changes in said distance;
and an automatic header height control system which receives the signal from the distance sensor and acts to raise and lower the feeder house in response to the signal from the distance sensor so as to raise and lower the feeder house relative to the header and attempt to maintain said distance at a required set value.

2. The header assembly according to claim 1 wherein the adjustable link is a hydraulic cylinder.

3. The header assembly according to claim 1 wherein the suspension system is adjustable so as to set a required proportion of the weight of the header which is carried on the feeder house relative to a proportion of the weight of the header which is carried on the gauge wheels.

4. The header assembly according to claim 1 wherein the suspension system is arranged such that the proportion of the weight which is carried on the feeder house is of the order of 90%.

5. The header assembly according to claim 1 wherein there is provided a bottom stop arranged to limit downward movement of the header relative to the adapter and wherein the distance sensor and the automatic header height control system are arranged to maintain the header spaced above the bottom stop.

6. The header assembly according to claim 1 wherein the adjustable links are operated in synchronism.

7. A combination comprising:
a crop harvesting machine;
and a header assembly for attachment to the crop harvesting machine;
the crop harvesting machine comprising:
a vehicle for movement over ground having a standing crop for harvesting, the vehicle including a cab for an operator of the crop harvesting machine;
a support assembly for carrying the header assembly;
the header assembly comprising:
a header having a cutter bar for cutting standing crop and a crop transport device for transporting the cut crop inwardly from ends of the header to a collection location for feeding to the crop harvesting machine;
a connector mounting the header on the support assembly of the crop harvesting machine;
the connector being connected to the support assembly such that the crop at the collection location is fed through the connector to the support assembly so as to enter the crop harvesting machine;
the connector being connected to the support assembly such that the header is carried by the connector so as to be supported by the support assembly for movement of the header with the crop harvesting machine over the field to be harvested;

at least two ground engaging gauge wheels on the header one on each side of the adapter;

each gauge wheel being mounted on the header for up and down adjustment movement of a position of said each gauge wheel relative to the header to control the height of the cutter bar of the header from the ground;

an adjustable link operable by a control switch arranged to be located in the cab of the crop harvesting machine to adjust the position of the gauge wheel relative to the header to a required position so as to adjust a height of cut of the cutter bar;

wherein the gauge wheels are mounted on the header such that, when adjusted to the required position, the gauge wheels are fixed relative to the header substantially without any floating movement relative thereto;

the connector and the support assembly providing a suspension system to allow suspension movement of the header at least upwardly and downwardly relative to the crop harvesting machine;

the suspension system being arranged such that a major part of the weight of the header is carried on the crop harvesting machine and a smaller part is carried on the gauge wheels;

wherein the suspension system includes at least one first mechanical spring connected to a first side of the adapter and at least one second mechanical spring connected to a second side of the adapter which first and second springs flex independently to allow said suspension movement;

wherein said at least one first and said at least one second springs are connected between the adapter and the header;

a distance sensor for sensing changes in distance between a point on the header which moves with the header in said suspension movement and a point which is stationary relative to the crop harvesting machine as the header moves upwardly and downwardly relative to the crop harvesting machine and for generating an active distance signal proportional to the sensed changes in said distance;

and an automatic header height control system which receives the signal from the distance sensor and acts to raise and lower the support assembly in response to the signal from the distance sensor so as to raise and lower the support assembly relative to the header and attempt to maintain said distance at a required set value.

8. The header assembly according to claim 7 wherein the adjustable link is a hydraulic cylinder.

9. The header assembly according to claim 7 wherein the suspension system is adjustable so as to set a required proportion of the weight of the header which is carried on the feeder house relative to a proportion of the weight of the header which is carried on the gauge wheels.

10. The header assembly according to claim 7 wherein the suspension system is arranged such that the proportion of the weight which is carried on the feeder house is of the order of 90%.

11. The header assembly according to claim 7 wherein there is provided a bottom stop arranged to limit downward movement of the header relative to the adapter and wherein the distance sensor and the automatic header height control system are arranged to maintain the header spaced above the bottom stop.

12. The header assembly according to claim 7 wherein the adjustable links are operated in synchronism.

* * * * *